United States Patent [19]
Pettey et al.

[11] Patent Number: 6,067,590
[45] Date of Patent: May 23, 2000

[54] DATA BUS AGENT INCLUDING A STORAGE MEDIUM BETWEEN A DATA BUS AND THE BUS AGENT DEVICE

[75] Inventors: Christopher J. Pettey; Dwight Riley, both of Houston, Tex.

[73] Assignee: Compaq Computer Corporation, Houston, Tex.

[21] Appl. No.: 08/873,636

[22] Filed: Jun. 12, 1997

[51] Int. Cl.[7] .............................. G06F 13/00; G06F 13/40
[52] U.S. Cl. .......................... 710/100; 710/105; 710/126; 710/129; 710/52
[58] Field of Search ..................................... 395/280, 285, 395/306, 309, 872; 710/100, 105, 126, 129, 52

[56] References Cited

U.S. PATENT DOCUMENTS

| | | | |
|---|---|---|---|
| 4,744,023 | 5/1988 | Welsch | 395/200.64 |
| 4,827,473 | 5/1989 | Tsuzuki et al. | 370/409 |
| 5,623,644 | 4/1997 | Self et al. | 395/558 |
| 5,751,999 | 5/1998 | Suzuki | 711/167 |
| 5,760,626 | 6/1998 | Pelley, III | 327/207 |

*Primary Examiner*—Ayaz R. Sheikh
*Assistant Examiner*—Rupal D. Dharia
*Attorney, Agent, or Firm*—Sharp, Comfort & Merrett, P.C.

[57] ABSTRACT

A system and method of transferring data on a data bus is disclosed. The system includes a data bus agent having a storage medium connectable to a data bus and arranged to store data and a bus agent device adapted to receive data from the storage medium. The method includes driving a signal on a data bus by a first bus agent, sampling the signal at a second bus agent, storing the sampled signal in a storage medium associated with the second bus agent, and processing the stored signal at the second bus agent.

14 Claims, 9 Drawing Sheets

DATA BUS AGENT INCLUDING A STORAGE MEDIUM BETWEEN A DATA BUS AND THE BUS AGENT DEVICE

This invention relates to data transfer using a data bus.

BACKGROUND

Personal computers and communication equipment provide for expansion of hardware functionality by the use of expansion buses. An early personal computer expansion bus used in personal computers based on Intel x86 processors was known as the Industry Standard Architecture (ISA) bus. The ISA bus allowed circuit boards to be compatibly added to a personal computer thereby providing additional functionality. The ISA bus operated at a maximum bus frequency of 8.22 Megahertz (MHz) and transferred data over a 16-bit data bus.

As personal computers became more powerful, the 8.22 MHz ISA bus became a bottleneck restricting data transfer between the processor and ISA bus peripherals. Alternative bus structures were developed to supplement or replace the ISA bus. One solution was the Extended Industry Standard Architecture (EISA) bus providing 32-bit data paths and high speed data transfer functions while maintaining backward compatibility with the ISA bus. A competing solution was the Micro-Channel Architecture (MCA) offered by IBM. This bus also offered 32-bit data paths and high speed data transfer functions, but did not maintain backward compatibility with the ISA bus.

As processing speed further increased and microprocessor architectures diversified, a need arose for a high-speed microprocessor independent bus. This need was met by the development of the Peripheral Component Interconnect (PCI) bus. The PCI bus provides a high speed, microprocessor independent bus that can be used to either replace or supplement existing expansion buses. The PCI bus is defined in the Peripheral Component Interconnect Specification, versions 1.0, 2.0 and 2.1 available from the PCI Special Interest Group, Portland, Oreg. PCI buses typically have either a 32-bit data path or a 64-bit data path operating at 33 MHz clock speeds. This enables maximum data transfer speeds of 132 Mbytes/second for a 32-bit bus and 264 Mbytes/second for a 64-bit bus.

Peripheral devices, also known as "bus agents," may be added to a PCI bus. For example, hard disk drives and their controllers, video output devices, network interface devices, memory devices, magnetic tape controllers, and other devices may be added to the computer system. PCI signal propagation and bus agent response time limitations restrict the maximum bus operation speed and the maximum number of devices that can be connected to a PCI bus. Additional computer system design flexibility can be gained by relaxing these limitations may undesirably restrict computer system performance and expandability. Additionally, relaxing strict PCI timing requirements can simplify the design of high-speed PCI bus agents.

SUMMARY

In general, in one aspect, the invention features a data bus agent including a storage medium that is coupled to a data bus and which stores data sampled from the bus. Bus agent logic is adapted to receive data from the storage medium.

Implementations of the invention may include one or more of the following. The bus agent can include latching registers that function as a bus agent storage medium. The bus can have signal paths conforming in number to PCI Special Interest Group PCI 2.1 bus signal paths and which couple the storage medium to the bus. Implementations may also include a bus having an operating frequency greater than 66 MHz.

A bus agent can include support for multiple bus access protocols. The multiple bus access protocols can include a protocol wherein bus signals are stored in a storage medium prior to processing, and another bus protocol wherein processing need not be preceded by storage in the storage medium. A bus protocol can include signal storage during a storage phase of a first clock period and a response that is driven on the bus during a response phase of a second clock period. A bus protocol can also include storing sampled signals during a storage phase of a first clock period and driving a response on the bus during a response phase of the first clock period.

In general, in another aspect, the invention features a method of transferring data on a data bus. The method includes a first bus agent driving a signal on a data bus. A second bus agent samples the driven signal, stores it in a storage medium, and processes the stored signal.

Implementations of the invention may include a second bus agent that drives a response signal on the data bus. Implementations may also include a data bus operating mode wherein signals sampled by a bus agent are stored in a storage medium associated with the bus agent prior to processing by bus agent logic.

In general, in another aspect, the invention features a computer system including a processor, a data bus interfaced to the processor, and a bus agent on the data bus having a storage medium to store data sampled from said data bus prior to processing by the bus agent.

Implementations of the invention may include one or more of the following features. Bus agents conforming to PCI Special Interest Group standards can connect to the bus. Also, implementations can include bus agents that selectively transfer data using either a protocol in which signals are stored in a storage medium prior to processing by the bus agent or a protocol in which sampled signals need not be stored in the storage medium prior to processing. The system can also include a processor that determines a bus operation mode.

Among the advantages of the invention are better response tine budgets for bus agents, and the ability to implement a bus having signal paths compatible with standard PCI bus agents but with an increased propagation path length or with operating frequencies greater than that of standard PCI agents for the given bus length. Other advantages and features will become apparent from the following description and from the claims.

DESCRIPTION OF THE EMBODIMENTS

Figure 1:
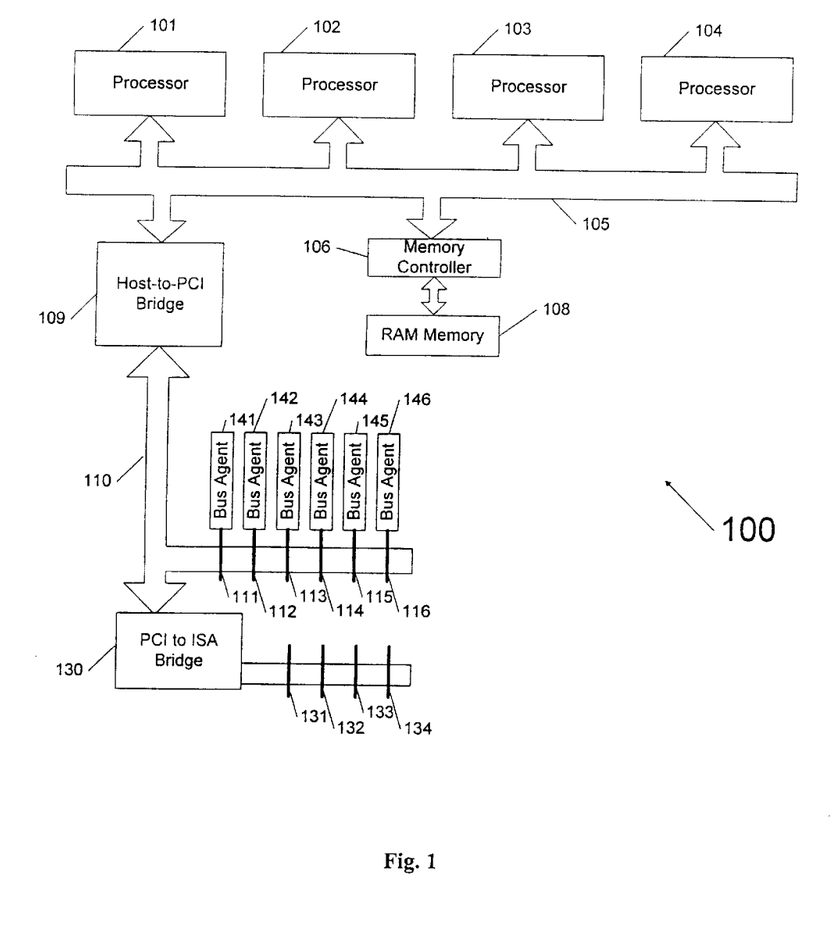
FIG. 1 schematically illustrates a computer system having multiple processors and a PCI data bus.

In FIG. 1 is a computer system 100 having a PCI bus 110 and one or more central processors (CPUs) 101–104 connected to a processor host bus 105 over which they provide data, address and control signals. The processors 101–104 may be Intel Pentium-Pro (TM) processors. A memory controller 106 is connected over the host bus 105 and provides an interface to random access memory 108. A Host-to-PCI bridge 109 is also connected over the host bus 105 to receive signals. The bridge 109 permits signals on the PCI bus 110 to be compatibly exchanged with signals on the processor host bus 105. Additionally, the bridge 109 provides PCI bus 110 data buffering and data transfer rate matching to allow, for example, a processor having a 64-bit 66 MHz interface and a 533 Mbytes/second data transfer rate to be interfaced to a PCI bus having a data path differing in, for example, data path bit width, clock speed, or data transfer rate. The system 100 may also have a legacy device bridge 130 providing a connection between PCI bus signals and, for example, an ISA bus having connection slots 131–134. PCI chip set implementations such as the AMD-640™ chip set or the Intel 430VX™ chip set, may combine memory controller functionality 106 and host-to-PCI bridge functionality 109.

Computer system accessories 141–146, referred to herein as "agents" or "bus agents," may be connected to the PCI data bus by bus agent connector slots 111–116. Bus agents include, for example, a video controller to store graphics data and interface to a display device, a hard disk controller to access stored programs and data, and a network interface controller to allow access to a local area network (LAN). Factors such as electrical loading, signaling voltages, and maximum bus clock frequencies restrict a PCI bus to a maximum number of bus agents and a maximum data transfer rate.

Figure 2:
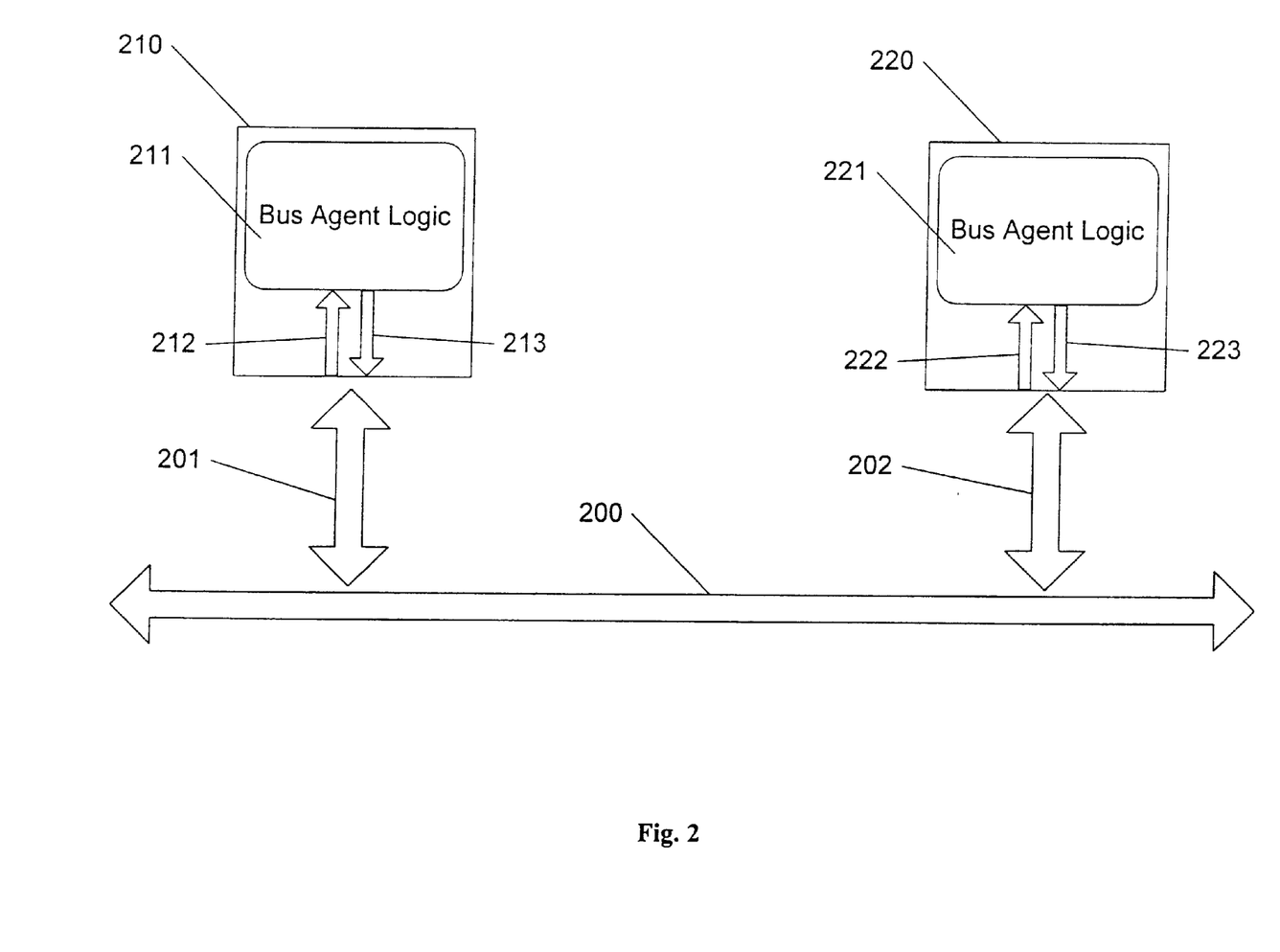
FIG. 2 illustrates a segment of a PCI data bus having two connected bus agents.

Industry standards for PCI buses and bus agents are published by the PCI Special Interest Group. Current industry standards are published in the *PCI Local Bus Specification Revision* 2.1, Jun. 1, 1995 (the "PCI 2.1 specification") and are incorporated herein by reference. PCI buses and bus agents conforming to this standard are referred to herein as PCI 2.1 buses and PCI 2.1 bus agents. Shown in FIG. 2 is a segment 200 of a PCI 2.1 bus having two connected PCI 2.1 bus agents 210, 220. A PCI 2.1 bus 200 may operate at bus frequencies of up to 66 MHz. Bus agents 210, 220 connect to the bus 200 over a connection interface 201, 202. The interface 201, 202 typically has 47 or 49 signal connections for a 32-bit bus and 86 or 88 signal connections for a 64-bit bus. Bus agents 210, 220 have bus agent logic 211, 221 to generate and respond to signals on the bus 200.

Bus agents 210, 220 may engage in data transfers with other bus agents, or may transfer data over a host-to-PCI bridge 109 to, for example, a processor 101–104. A host-to-PCI bridge 109 may be viewed as a specialized bus agent having additional functionality to control operation of the PCI bus. For example, the host-to-PCI bridge 109 may regulate bus operating frequency and arbitrate among competing bus agent bus access requests. Throughout this disclosure, a host-to-PCI bridge 109 is, unless otherwise distinguished, viewed as a bus agent.

Each of the bus agents 210, 220 may participate in a data transfer transaction as either an initiator bus agent or as a target bus agent. An initiator is a bus agent that begins a data exchange transaction with another bus agent. Correspondingly, a target is a bus agent that reacts to the data exchange transaction commenced by the initiator. Bus agent logic 211, 221 commonly includes both initiator functionality and target functionality allowing the bus agent 210, 220 to selectively commence or respond to a data exchange request on the PCI bus 200. Alternatively the bus agent logic 211, 221 may implement only initiator functionality or only target functionality. Additionally, bus agents 210, 220 are both data consumers and data sources. A bus agent that samples (receives) a signal driven on the bus is a consumer of that signal. Correspondingly, a bus agent that drives a signal on the bus is a source of that signal. Signals driven on the bus may be in either a high or a low logic state.

The current PCI 2.1 specification defines buses operable at maximum frequencies of either 33 MHz or 66 MHz. These bus frequencies correspond, respectively, to 30 nS (nanosecond) and 15 nS bus clock cycle periods. Other frequencies in the range of 0–66 MHz may also be used. Each PCI bus clock cycle can be divided into four segments. These segments are the time required for a source to drive a valid signal on the bus ($T_{val}$), the maximum time allocated for signal propagation on the bus ($T_{prop}$), clock skew ($T_{skew}$), and input setup time ($T_{su}$). The portion of the total clock cycle period allocated to each of these time segments is a function of, for example, bus operating frequency, maximum bus length and required bus agent logic response time. The current PCI 2.1 specification defines 33 MHz and 66 MHz buses with clock periods allocated as shown in Table 1.

TABLE 1

Allocation of Clock Period for 33 MHz and 66 MHz PCI 2.1 Buses

| | $T_{su}$ | $T_{val}$ | $T_{prop}$ | $T_{skew}$ | Total |
|---|---|---|---|---|---|
| 33 MHz PCI 2.1 Bus | 7 nS | 11 nS | 10 nS | 2 nS | 30 nS |
| 66 MHz PCI 2.1 Bus | 3 nS | 6 nS | 5 nS | 1 nS | 15 nS |

Signals driven on a PCI bus are sampled by the consumer bus agent during the rising edge of a clock pulse. The rising edge of the clock pulse occurs at the boundary between periods $T_{su}$ and $T_{val}$. To permit proper sampling, the signal must be available to the consumer during the period $T_{su}$ that precedes the rising clock edge. PCI 2.1 bus agent logic 211, 221 must then process the sampled signal and drive a valid response signal on the PCI bus before the end of the period $T_{val}$. The driven response signal then propagates along the bus during the period $T_{prop}$ so that it is available at the consumer bus agent during the next $T_{su}$ period. Period $T_{skew}$ is included to account for cycle time variations in the bus clock.

To function reliably, PCI 2.1 bus agents usually must drive, sample, and process signals within the precise timing requirements shown in Table 1. In the case of a bus agent operating at 66 MHz, the agent may have as little as 3 nS (the period $T_{su}$) during which a valid signal from a source will remain at the agent's bus interface 201, 202. The agent must sample the signal during the rising clock edge following $T_{su}$ and must drive a valid response signal on the bus during the 6 nS period $T_{val}$ following the clock edge. High speed, and correspondingly high precision, bus logic must be employed to meet these timing requirements. Additionally, the limited signal propagation time, $T_{prop}$, restricts the maximum length of the PCI bus and thereby restricts the number of bus agents that may be attached to the bus.

Figure 3:
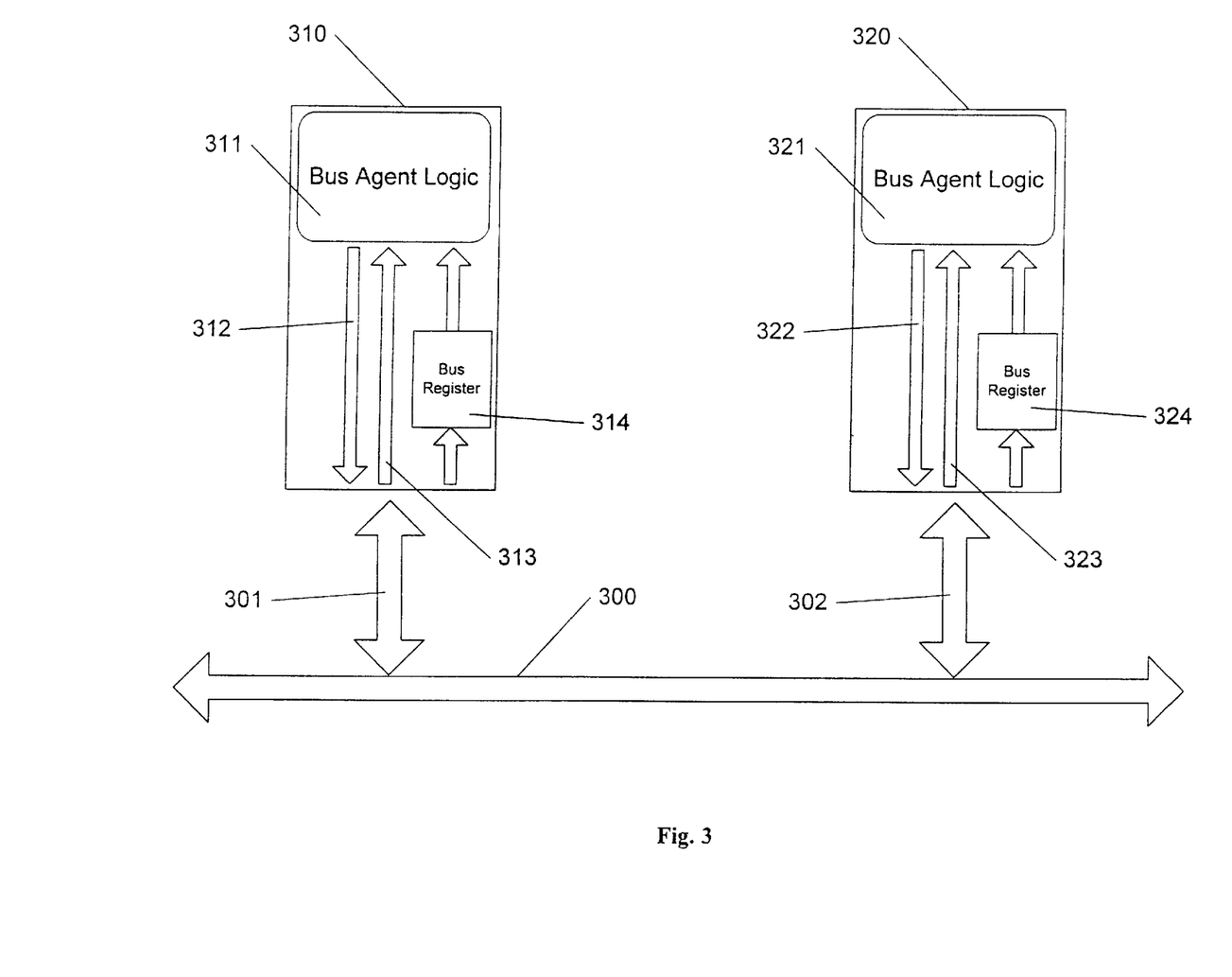
FIG. 3 illustrates a segment of a data bus having two connected bus agents with bus access registers.

The strict timing limitations used for current PCI 2.1 buses and bus agents can be relaxed by adding bus interface registers to bus agents. Illustrated in FIG. 3 is a bus 300 to which bus agents 310, 320 are coupled. Bus agents 310, 320 have bus registers 314, 324 to sample and store ("latch") signals driven on the bus. Additionally, bus agent logic 311, 321 implements a registered bus access protocol that determines, controls and assures proper timing of bus signal driving and sampling. The registered bus access protocol is based on standard PCI 2.1 protocol in that it provides a similar number of electrical signals on the data bus, however, the registered protocol provides differing bus signal timing and logical operations so as to properly process signals stored in bus registers 314, 324.

Bus agents having bus registers 314, 324 and associated bus agent logic 311, 321 are referred to herein as registered agents. A bus 300 supporting registered agents is referred to as a registered bus. The registered bus 300 may have signal paths similar in number to those of standard PCI 2.1, thereby allowing optional PCI 2.1 compatibility. However, a registered bus 300 may differ from a standard PCI 2.1 bus in, for example, bus length and operating frequency. Buses and bus agents may be implemented with both a PCI 2.1 compatible mode and a registered mode. In such buses and agents, the PCI 2.1 mode provides bus signaling and access conforming to the PCI 2.1 specification. The registered mode uses a bus access protocol providing for proper bus agent processing of signals stored in bus registers 314, 324. In registered mode, bus agent response logic 311, 321 obtains bus signals after the have been stored in the bus register 314, 324. In PCI 2.1 compatible mode, the bus agent response logic 311, 321 obtains signals from the PCI bus without the use of latching registers 314, 324 using a bus register bypass data path 313, 323.

In an exemplary implementation, during registered bus mode operation, storage of data in the bus agent's register 314, 324 occurs during a sampling clock cycle and a response is driven on the bus during a subsequent clock cycle. Thus bus agent logic receives signals one clock after they are first available for sampling on the bus. For example, if a signal is sampled at clock cycle (t), a response to that signal is typically not driven on the bus before the period $T_{val}$ at clock cycle (t+1). This differs from PCI 2.1 operation in which a signal sampled at clock cycle (t) may require art response signal to be driven on the bus during the period $T_{val}$ immediately following the sampling period. The additional clock period prior to generation of a registered mode response may be apportioned among increased bus logic signal processing time or increased bus propagation time thereby allowing longer buses having additional bus agent connection slots.

Referring still to FIG. 3, in an exemplary transaction between bus agent 310 functioning as a source of data and bus agent 320 functioning as a consumer of data, a signal is driven on the bus by bus agent 310 on clock cycle (t). Note that this disclosure follows signal description conventions in the PCI 2.1 specification whereby a signal is said to be driven on the bus on clock cycle (t) if it is available to the consumer bus agent during the period $T_{su}$ prior to the rising edge of clock cycle (t) such that it may be sampled on the rising edge of clock cycle (t). During the rising edge of clock cycle (t) the signal is stored in bus access register 324. After storage, the signal propagates from the bus access register 324 to bus agent logic 321.

The propagation period between the bus access register 324 and bus agent logic 321 will generally be of shorter duration than the bus propagation period $T_{prop}$ due to a typically short signal path between bus agent register 324 and bus agent logic 321. When the latched signal reaches bus agent logic 321, processing of the signal and generation of a response begins. Because the propagation period between the bus access register 324 and bus agent logic 321 is short, the signal stored in the bus access register 324 is available at the bus agent logic for a registered mode agent logic setup period that is greater than the standard PCI 2.1 logic setup period $T_{su}$. During this registered mode agent logic setup period, processing of the signal stored in bus access register 324 may begin so that during the bus signal driving period $T_{val}$ following clock cycle (t+1) a response may be driven on the PCI bus 300.

Since registered mode agent logic setup period is typically greater than the PCI 2.1 bus logic setup period $T_{su}$, additional time is available for bus logic processing prior to the rising edge of clock cycle (t+1). This may allow the bus signal driving period $T_{val}$, needed by a registered mode agent to be shorter than the period needed by a non-registered PCI 2.1 mode agent. Where the bus signal driving period needed by a registered mode agent is less than that needed by a PCI 2.1 agent, the time saved may be reallocated to, for example, bus propagation time so as to accommodate longer buses, or allocated to allow higher frequency bus operation. Finally, at clock cycle (t+2) the response driven on the bus by the registered mode agent during the bus signal driving period is stored by bus registers in the initiator bus agent 310 such that initiator bus logic may receive the response by clock cycle (t+3). Thus, in this example, the time required for a registered mode signal to be sent from a source to a consumer and for a response to be received from the consumer by the source bus logic is 4 clock cycles. Note that in PCI 2.1 mode operation, a similar data transfer may complete in as little as two clock cycles.

Modifications to the PCI 2.1 signal handling and bus access protocols described in the PCI 2.1 specification are necessary to implement registered mode operation. In the following description, bus signal names and functions are as described in the PCI 2.1 specification, however, in registered mode, signal timing and processing differ. In an exemplary protocol, referred to herein as the registered protocol, two modes of operation are provided. In the first mode, referred to as PCT 2.1 mode, standard PCI 2.1 bus signals and signal timing is used for data exchange. This mode ensures backward compatibility with computer systems and buses not providing registered mode compatible operation. In a second mode, referred to as registered mode, bus register storage is used.

In the exemplary protocol, registered mode is used only when all bus agents on a bus are registered mode capable. In registered mode, single-clock bus agent responses are replaced with clock-pair boundary response. Clock pair boundary responses accommodate bus register usage at both initiator and target bus agents. Once the registered mode initiator and target have driven asserted the IRDY# and DEVSEL# bus signals to identify the start of the first clock pair, control signals are, in general, switched only on clock-pair boundaries. A first clock-pair boundary is defined to be the rising edge of the clock signal after DEVSEL# is driven asserted by the target bits agent and subsequent clock-pair boundaries occur throughout the transaction every two clock cycles thereafter. Thus, in FIG. 4, clock pair boundaries exist at clock cycles 6, 8, 10, and 12.

Additionally, the exemplary protocol requires that an initiator in registered mode must drive asserted the initiator ready signal IRDY# no later than the second clock cycle after driving an address on the bus. Single-cycle "fast" address decode and single-cycle "fast" DEVSEL# signal assertion is not used in registered mode due to the required bus signal storage cycle. Furthermore, during a registered mode burst transaction, FRAME#, IRDY#, TRDY#, STOP#, and DEVSEL# signals can only change on clock-pair boundaries. As a result, data phases, defined as clock periods during which data is transferred, always come in pairs, wait states always come in pairs and only occur on even numbered data-phase clock boundaries (starting with data phase number 0), the "last" data phase period (which, in PCI 2.1 mode, is a single data phrase between the time FRAME# is driven deasserted and IRDY# is driven deasserted) becomes two data phases in registered mode, and data stepping (a PCI 2.1 technique by which a bus agent may spread the driving of qualified bus signals over several clocks) is not permitted.

Furthermore, the exemplary protocol requires that during a registered mode single data phase transaction (that is, a transaction in which FRAME# is driven deasserted when IRDY# is driven asserted, or if the target is only prepared to complete a single data phase or drives asserted the Retry or Target-Abort signals), from the time DEVSEL# is driven asserted, FRAME#, IRDY#, STOP#, and DEVSEL# can only change on a clock-pair boundary. TRDY# is driven asserted on a clock-pair boundary and driven deasserted one clock cycle after that. If a bus agent detects a data parity error, it will drive asserted PERR# on the clock cycle after PAR is sampled (one clock cycle later than for PCI 2.1). An initiator can drive asserted FRAME# no earlier than the second clock after its grant signal GNT# is driven asserted and may continue to drive asserted FRAME# on the clock after its GNT# is driven deasserted.

Figure 4:
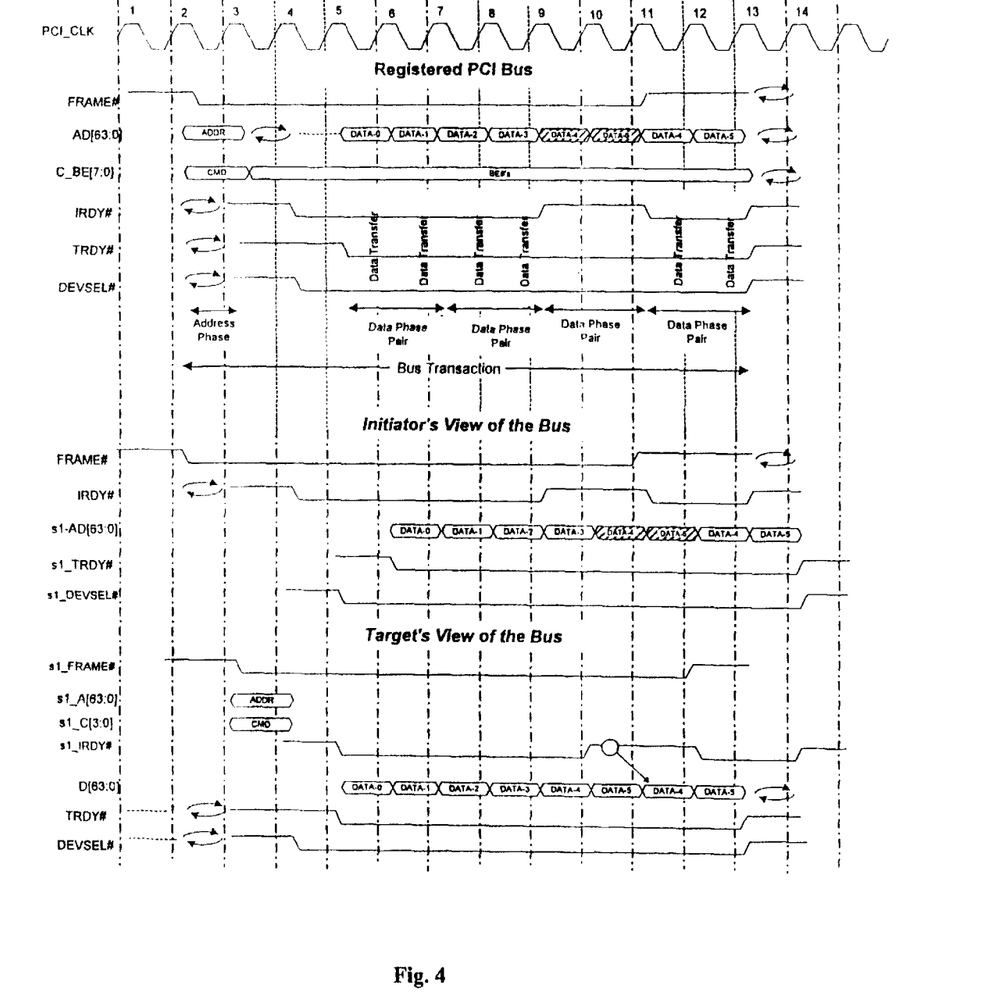
FIG. 4 is a signal timing diagram showing a burst read transaction between bus agents having bus access registers and illustrating initiator agent wait states.

The registered mode signal timing diagram in FIG. 4 illustrates application of the foregoing exemplary protocol rules during a burst-read transaction in which an initiator reads data from a target bus agent and the initiator inserts a two clock wait state pair (as indicated by the IRDY# signal being driven deasserted) during the transaction. The top portion of FIG. 4, labeled "Registered PCI Bus," shows the signals oil the bus. The middle portion of the figure labeled "Initiator's View of the Bus" and lower portions of the figure labeled "Target's View of the Bus" show signals driven oil the bus as seen by the initiator and target, respectively. Bus signal names are shown along the left side of the illustration. A signal name preceded by an "s1_" indicates the signal as it is viewable to bus agent logic 311, 321 after storage in the bus registers 314, 324. For example, on clock cycle 2 the initiator switches FRAME# so that it is driven asserted on the bus on clock cycle 3. The target samples FRAME# on clock cycle 3. The sampled FRAME# signal then becomes available to bus agent logic as signal s1_FRAME# after the rising edge of clock cycle 3.

In the FIG. 4 example, the FRAME# signal is driven asserted by the initiator bus agent on clock cycle 3 and the IRDY# signal is driven asserted on clock cycle 5. The first clock-pair boundary occurs at clock cycle 6. Clock cycles 6 to 10 are data phases during which the target drives data items DATA-0, DATA-1, DATA-2, DATA-3, DATA-4 on the bus as signal AD[63:0]. These data items are stored in the initiator's bus register during clock cycles 6 to 10, respectively. These data items are available to the initiator's bus agent logic as signal s1_AD[63:0].

At clock cycle 10, the initiator has driven IRDY# deasserted indicating that data will not be accepted during subsequent clock cycles. However, by this time DATA-4 has been sampled by the initiator and latched in its bus registers. Since IRDY# has been driven deasserted, the initiator bus agent logic is in a wait state and will not accept DATA-4 at clock cycle 11. At the target bus agent, the deasserted IRDY# is stored in the target's bus register at clock cycle 10. Subsequently, on clock cycle 11 the target agent drives DATA-5 on the bus when the wait signal is provided to the target's bus agent logic. Since the initiator is in a wait state, neither DATA-5 nor the previously driven DATA-4 will be accepted by the initiator. Target bus agent logic must compensate for this rejection of DATA-4 and DATA-5. In the example, the target compensates for the rejection of DATA-4 and DATA-5 by use of a back-up and repeat protocol whereby the driving of DATA-4 and DATA-5 signals is repeated. The target continues to repeat DATA-4 and DATA-5 until the initiator drives asserted the IRDY# signal and accepts the DATA-4 and DATA-5 data transfers. Note that during a burst data transfer, the last two data phases occur between the time that FRAME# is driven deasserted on one clock-pair boundary, and IRDY# is driven asserted on the next clock-pair boundary.

Figure 5:
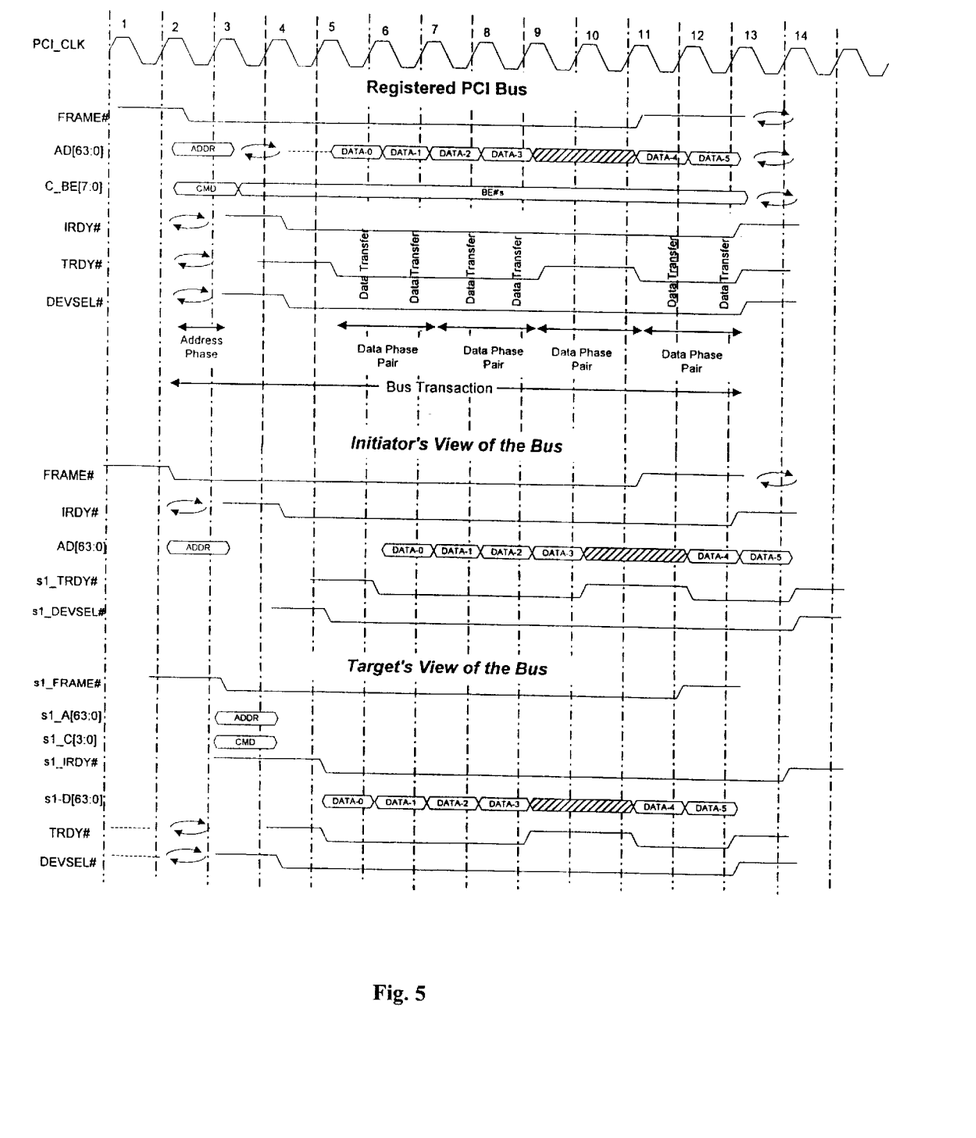
FIG. 5 is a signal timing diagram showing a burst read transaction between bus agents having bus access registers and illustrating target agent wait states.

For comparison purposes, FIG. 5 illustrates a similar transaction in which the target rather than the initiator inserts a wait state pair. Since the target controls both the data and target ready signal TRDY#, it does not need to implement a back-up and repeat protocol since the target does not necessarily advance to the next data item once the TRDY# signal is deasserted. Since the target does not necessarily drive a data item on the bus during a wait state, the value of the data on the data bus is not specified at clock cycle 10 and 11.

Figure 6:
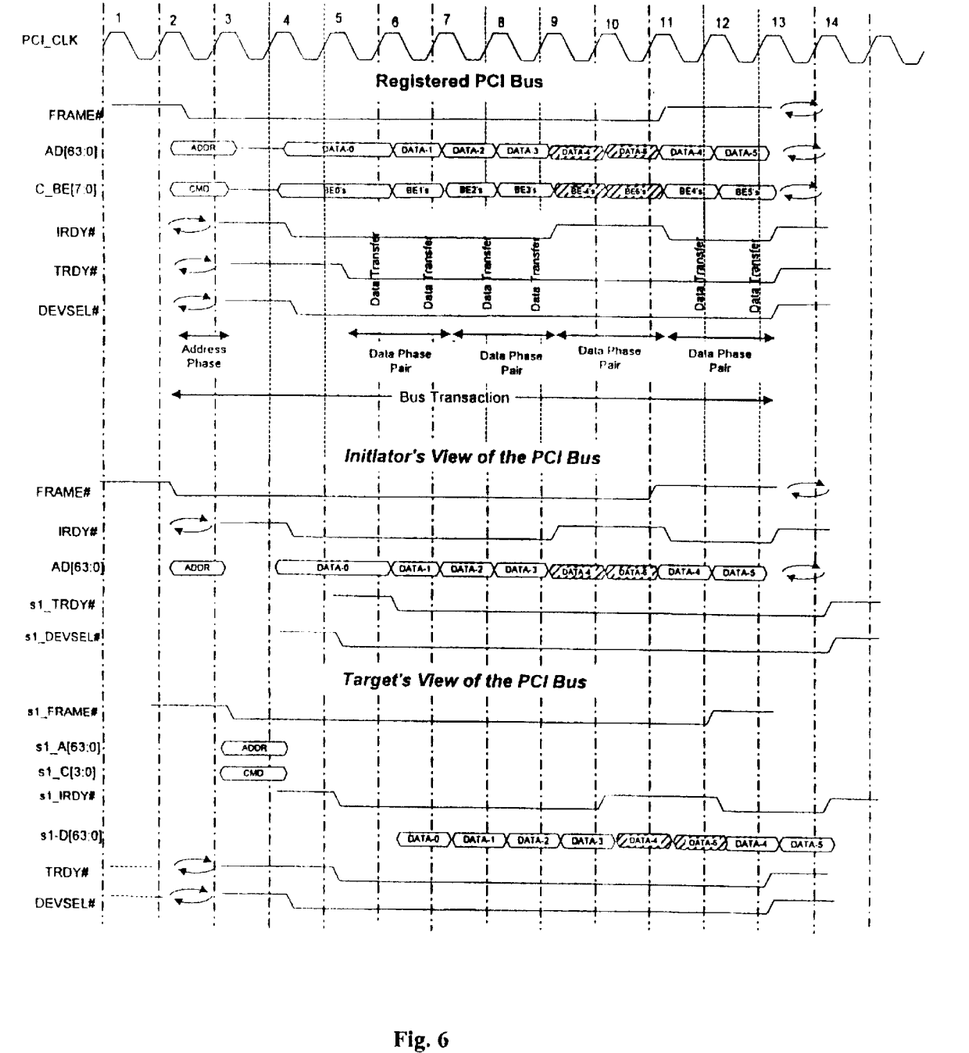
FIG. 6 is a signal timing diagram showing a burst write transaction between bus agents having bus access registers and illustrating initiator agent wait states.
Figure 7:
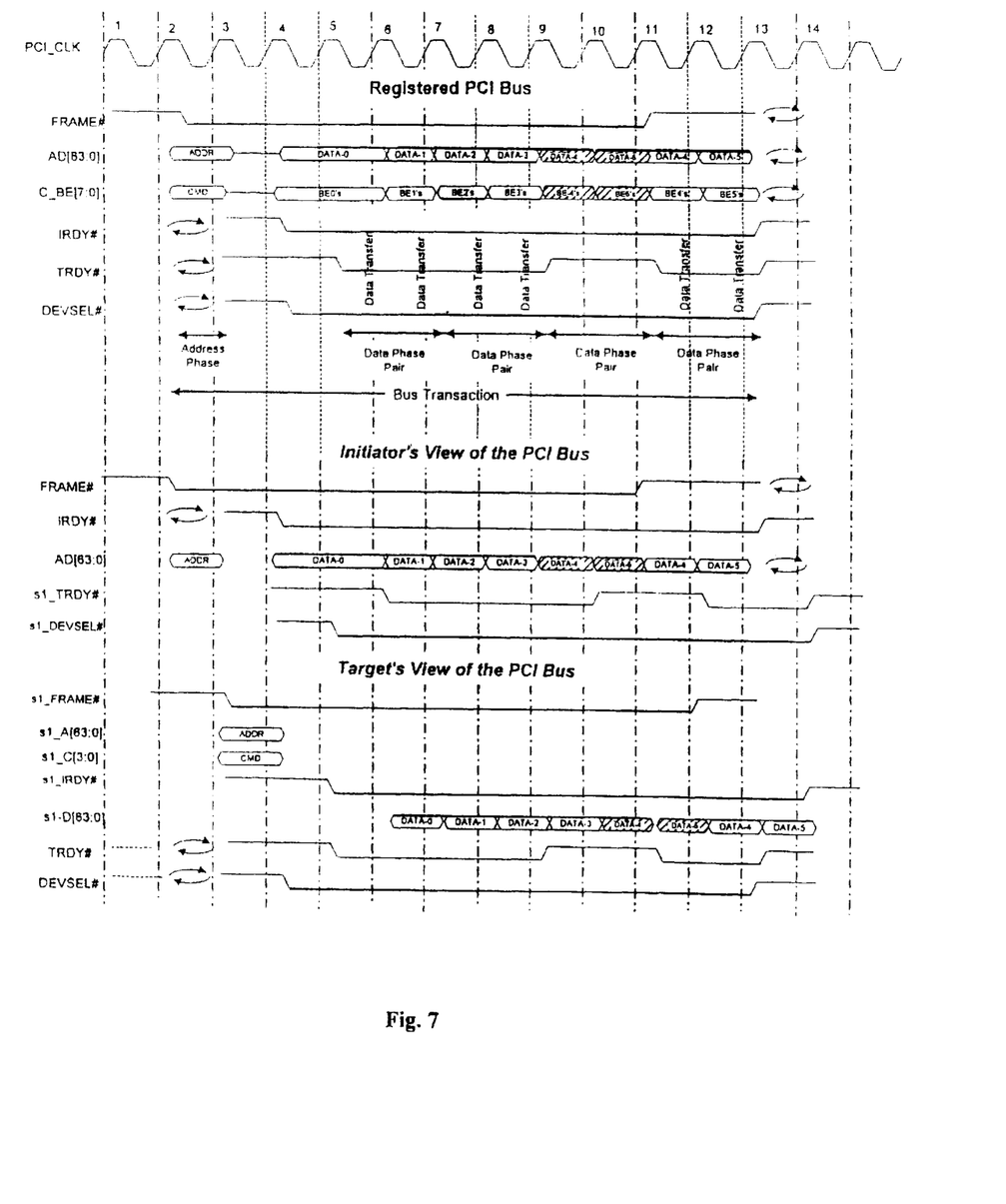
FIG. 7 is a signal timing diagram showing a burst write transaction between bus agents having bus access registers and illustrating target agent wait states.

Registered mode burst write transactions are illustrated in FIGS. 6 and 7. In FIG. 6 an initiator inserts wait states during a burst write operation by deasserting the IRDY# signal at clock cycles 10 and 11. In FIG. 7 a target inserts wait states during a burst write transaction by deasserting the TRDY# signal at clock cycles 10 and 11. In FIGS. 6 and 7, the IRDY# signal is driven asserted by the initiator bus agent at clock cycle 5, the latest time allowed by the exemplary registered mode protocol. As shown, the initiator must hold DATA-0 on the bus until the first clock-pair boundary (clock 6) at which both TRDY# and IRDY# are in an asserted state. This allows synchronization of clock pair boundaries by the initiator and the target. As shown in FIG. 6, when an initiator inserts a wait state pair by deasserting IRDY#, the value on the data bus is not specified since the initiator bus agent logic recognizes that the next data item need not be driven on the bus.

In contrast, as shown in FIG. 7, when the target deasserts TRDY# at clocks 10 and 11, the initiator bus logic will not react to this signal change until clock cycle 11. At that point, DATA-4 and DATA-5 have already been driven on the bus by the initiator, however, these signals will not be accepted by the target. Since DATA-4 and DATA-5 will not be validly transferred, the initiator must back up and repeat DATA-4 and DATA-5 until TRDY# is driven asserted on a clock pair boundary. Note that the last two data phases occur between the time that FRAME# has been driven deasserts on one clock-pair boundary, and IRDY# is driven asserted on the next clock-pair boundary.

Data on a registered bus may also be transferred using single data phase read and write transactions rather than burst transactions. Single data phase transactions transfer only a single data item. Single data phase transactions in registered mode may be implemented in a unique way wherein TRDY# is asserted on a clock-pair boundary, but is deasserted one clock cycle later, in the middle of the clock pair.

Figure 8:
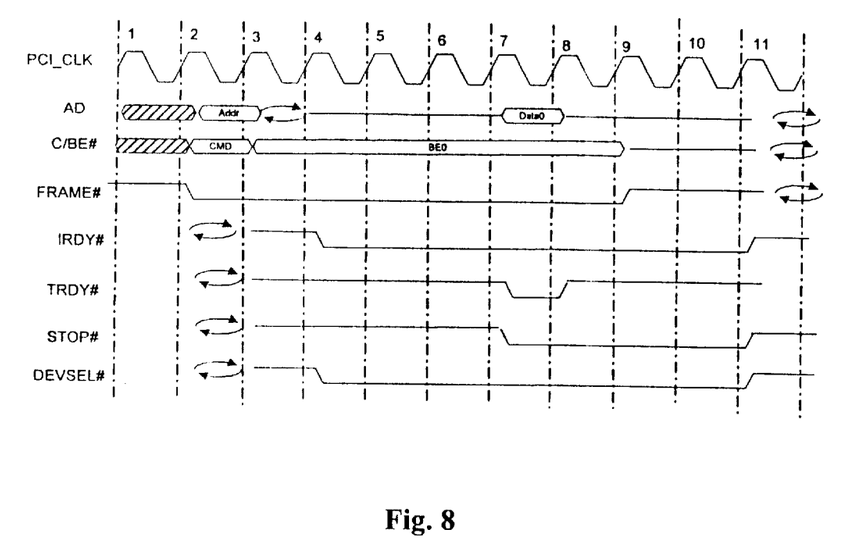
FIG. 8 is a signal timing diagram showing a single data phase read transaction with a single wait state.
Figure 9:
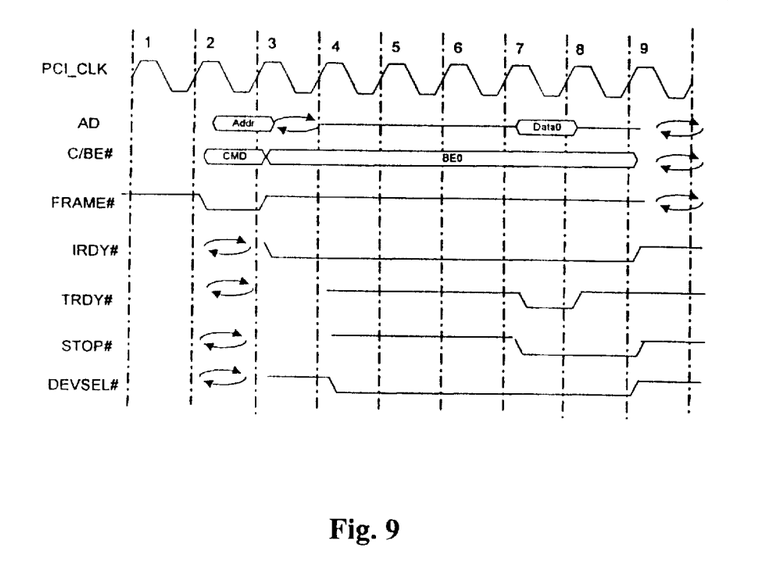
FIG. 9 is a signal timing diagram showing a single data phase read transaction with a single wait state pair.

Illustrated in FIGS. 8 to 11 are single-data-phase read and write transactions. In FIGS. 8 to 11 signals present on the bus are shown. Latched ("s1_") signals are not shown in FIGS. 8 to 11, however, such signals may be derived from the illustrated bus signals and the examples presented in FIGS. 4 to 7. FIG. 8 illustrates a single data phase transfer in which an initiator attempts a burst read transaction but the target is prepared to accept only a single data phase as indicated by the simultaneous assertion of TRDY# and STOP# by the target at clock 8. In FIG. 9, the initiator attempts only a single data phase. The initiator indicates this by deasserting FRAME# when IRDY# is asserted. In both figures the target bus agent logic inserts one wait state pair at clocks 6 and 7 to allow for synchronization of clock pair boundaries, and then asserts TRDY# for a single clock cycle at clock 8.

Figure 10:
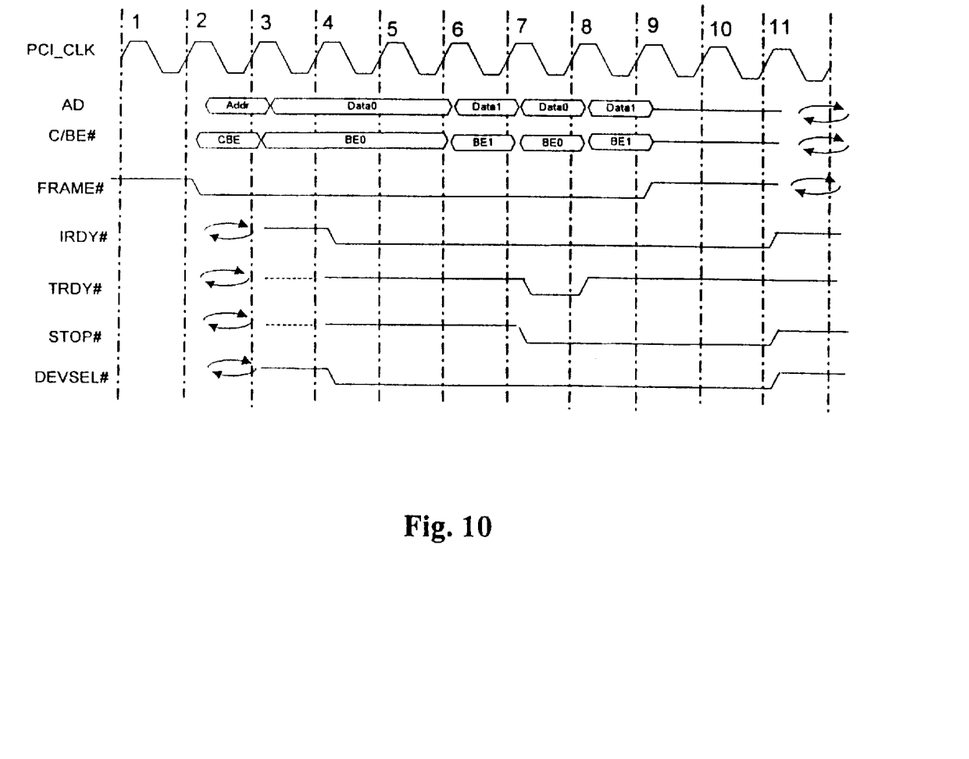
FIG. 10 is a signal timing diagram showing a single data phase write transaction with a single wait state pair.
Figure 11:
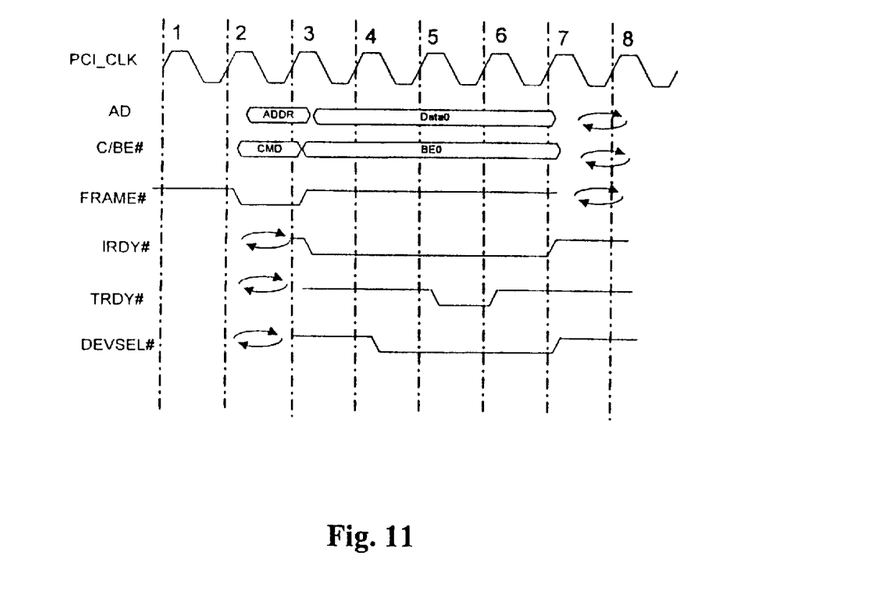
FIG. 11 is a signal timing diagram showing a single data phase write transaction with no wait states.

Illustrated in FIG. 10 is a single data phase transaction occurring when an initiator attempts a burst write transaction but the target is prepared to accept only a single data phase. In this example, TRDY# is not driven asserted on clock cycle 6, the first clock-pair boundary, thus requiring that the initiator back up and repeat the driving of DATA-0 and DATA-1 signals until TRDY# is driven asserted on a clock-pair boundary. As with a single data phase read transaction, TRDY# is asserted on a clock-pair boundary, and subsequently is driven deasserted in the middle of a clock pair. Other registered signals are exchanged on clock pair boundaries. In FIG. 11, the initiator attempts a single data phase transaction by deasserting FRAME# when IRDY# is driven asserted. In this example, the target does not insert any wait states, TRDY# is asserted at the first clock-pair boundary, clock cycle 6, for a single clock.

The PCI 2.1 specification defines two categories of buses and two categories of bus agents. PCI 2.1 buses may be either 33 MHz buses typically having as many as 6 bus agents, or 66 MHz buses typically having only two bus agent connections. PCI 2.1 bus agents operate at a maximum frequency of either 33 MHz agents or 66 MHz. PCI 2.1 buses and agents will operate at 66 MHz only if the bus and all bus agents and are operable at 66 MHz.

Registered mode operation introduces new bus and bus agent types. In particular, registered buses operable at 66 MHz may have longer propagation piths than PCI 2.1 66 MHz buses due to changes in bus agent timing requirements. For example, the bus propagation period $T_{prop}$ on a 66 MHz registered bus may be longer than that on a 66 MHz PCI 2.1 bus thereby permitting longer 66 MHz registered buses. However, such registered buses may not meet PCI 2.1 timing requirements and therefore may not support 66 MHz PCI 2.1 operation. For this reason, such extended length registered buses should be operated at 66 MHz only with 66 MHz registered mode bus agents. Additionally, registered bus agents may be designed to support 66 MHz operation only in registered mode. Using the example registered protocol, the maximum operating frequency of the registered bus may be limited to the maximum common operation frequency of the bus and all its attached bus agents. Furthermore, in this example embodiment, registered mode operation is implemented only if all bus agents are operating in registered mode.

To determine the proper operating mode of a registered bus and attached bus agents, it is necessary to distinguish registered agents and PCI 2.1 bus agents. PCI Command Register bit 10 may be used for this purpose. PCI 2.1 bus agents implement command register bit 10 as a read-only bit that returns '0' when read. To distinguish PCI 2.1 and registered bus agents, registered agents may implement bit 10 as a read/write bit, storing a bit value of '0' to indicate PCI 2.1 mode operation and a bit value of '1' to indicate registered mode operation. Upon initialization, all bus agents should have a value of '0' stored in bit 10 and operate in PCI 2.1 mode. A computer system having a registered bus must interrogate each bus agent to determine if registered mode operation is supported. To do so, the computer system issues a write command to each bus agent to change the value of bit 10 from '0' to '1' followed by a read command to determine if the value of bit 10 has changed. If a bus agent supports only PCI 2.1 operation, the write attempt will fail and a subsequent read of bit 10 will return a value of '0.' However, if the bit value has changed to '1', it indicates that the bus agent is capable of registered mode operation.

After a '1' is written to Command Register bit 10 of a registered bus agent, that agent will begin operation in registered mode. During the subsequent command status bit 10 read operation, the bus agent will respond using PCI 2.1 signal timing if the agent is a PCI 2.1 device, and will respond using registered mode signal timing if the agent is a registered mode device. Since the computer system and host bridge will not know the bus agent type until after a command status bit 10 read is complete, both computer system and host bridge must include logic to properly react to either PCI 2.1 signal timing or registered mode timing during the configuration read. Note that if any device on the bus does not support registered mode, then all devices on the bus must be returned to PCI 2.1 mode, either by resetting the bus, or by doing configuration writes to return bit 10 of each device to '0.'

Registered agents supporting 66 MHz operation in registered mode, but not in PCI 2.1 mode must provide proper mode-dependent information regarding supported bus operation frequencies. To do so, bit 5 of the PCI bus agent Status Register may be used. In PCI 2.1 bus agents, a value of '1' stored in bit 5 indicates 66 MHz capability and a value of '0' indicates a maximum operating frequency of 33 MHz. Registered agents supporting 66 MHz in both PCI 2.1 mode and registered mode should store a value of '1' in bit 5. Registered bus agents that are designed to run at 66 MHz only in registered mode should set bit 5 to '0' when not in registered mode, and to '1' when in registered mode, thereby indicating appropriate 66 MHz operating capability.

PCI 2.1 buses use a connector pin, designated M66EN, to indicate whether the bus segment is operating at 66 MHz or 33 MHz. On PCI 2.1 buses operable only at 33 MHz, the M66EN pin connects to a ground potential. If the PCI 2.1 bus is operable at 66 MHz, a pull-up resistor, typically 5 KΩ, connects the M66EN pin to a voltage potential $V_{cc}$. A PCI 2.1 bus agent that is not 66 MHz capable provides a pull-down resistor to reduce the M66EN signal level and thereby indicate that 33 MHz operation must be used. Registered agents meeting PCI 2.1 signal path propagation length and timing restrictions should implement M66EN signals in the same manner as PCI 2.1 agents. Registered agents operable at 66 MHz only in registered mode should treat M66EN as would a PCI 2.1 33 MHz bus agents. That is, they should provide a grounding resistor that provides a path to ground thereby reducing the M66EN voltage level.

If a bus agent that meets 66 MHz timing only in registered mode is installed on a 66 MHz bus, the pull-down resistor will force the bus to power up at 33 MHz. If the bus and computer system are designed to use registered mode, and all devices on the bus implement 66 MHz registered mode, then a configuration routine provides control signals to the host-to-PCI bridge to change the bus speed to 66 MHz and configure each of the devices on the bus to registered mode. If a standard 66 MHz adapter is installed in a 2-slot registered system, then the bus will power up at 66 MHz. When the configuration software determines that a device on the bus does not support registered mode, then all devices on the bus will be returned to standard PCI mode. A 4-slot 66 MHz registered bus powers up the bus at 33 MHz. If the configuration software determines that all bus agents support 66 MHz registered mode operation, the configuration routine may provide control signals to the host-to-PCI bridge to change the bus speed to 66 MHz. However, if the configuration software discovers a standard 66 MHz adapter installed in a 4-slot registered system, the bus should be operated at 33 MHz.

The foregoing descriptions are illustrative. Many changes may be made to the described embodiment. For example, computer buses with fewer or greater numbers of bus agent connections may be built, alternate registered mode protocols may be used, and protocols allowing simultaneous operation of registered mode agents and non-registered mode agents may be used. Additionally, although registered mode timing has been discussed primarily as a means to achieve greater bus lengths, the change in registered mode timing parameters can be used to provide increased bus operating frequency rather than increased bus length.

What is claimed is:

1. For use in a computer system including at least one processor coupled to a processor bus and a bridge coupled between the processor bus and an expansion bus, a data bus agent for being coupled to the expansion bus, the data bus agent comprising:

a storage medium arranged to store data;

bus signal paths conforming in number to PCI Special Interest Group PCI bus signal paths and operable to provide signal paths between the storage medium and the expansion bus;

said bus agent device adapted to receive data sampled from the storage medium; and said bus agent logic selectively responsive to signals in either a first protocol or in a second standard protocol; wherein:

said first protocol provides different timing and logical operations from said second standard protocol;

said first protocol sampled bus signals are stored in said storage medium during a storage phase of a clock period and a response is driven on the bus by the bus agent logic during a response phase of a subsequent clock period; and wherein in said second protocol the storage medium is not used to receive bus signals, said second protocol sampled bus signals being sampled during one phase of a clock period and a response is driven on the bus during a subsequent phase of the same clock period.

2. The bus agent of claim 1 wherein the storage medium connects to a bus having an operating frequency greater than 66 MHz.

3. The data bus agent of claim 1 wherein the storage medium comprises a latching register.

4. A method of transferring data on a data bus according to either of two protocols, the method comprising:

providing a data bus conforming to PCI Special Interest Group Specification 2.1;

driving a signal on the data bus by a first bus agent;

under a first protocol, sampling the driven signal in a second bus agent during a storage phase of a clock period and storing the sampled signal in a storage medium associated with the second bus agent; and during a response period of a subsequent clock period, operating the second bus agent to drive a response on the bus; and under a second protocol, said second bus agent samples said driven signal during one phase of a clock period and drives a response on the bus during a subsequent phase of the same clock period without having stored the sampled signal in said storage medium.

5. A computer system comprising:

a processor;

a data bus interfaced to the processor;

a plurality of PCI bus agents conforming to PCI Special Interest Group standards connected to the data bus, each of the PCI bus agents having a storage medium;

each said bus agent selectively transfer data using either a first protocol whereby sampled signals are stored in said storage medium of that bus agent prior to processing by bus agent or by using a second standard protocol whereby sampled signals need not be stored in said storage medium of that bus agent prior to processing by the bus agent;

wherein said first protocol provides different timing and logical operations form said second standard protocol;

said first protocol sampled signals are stored in said storage medium of a bus agent during a storage phase of a clock period and a response is driven on the bus by that bus agent logic during a response phase of a subsequent clock period; and said second protocol sampled signals are sampled during one phase of a clock period and a response is driven on the bus during a subsequent phase of the same clock period.

6. The computer system of claim 5 wherein the storage medium comprises a latching register.

7. The computer system of claim 5 wherein the data bus agent is a bus agent selected from the group consisting of video controllers, hard disk controllers and network interface controllers.

8. A computer system comprising:

at least one processor coupled to a processor bus;

a system memory coupled to the at least one processor through the processor bus;

a bridge coupled to the processor bus;

an expansion bus coupled to the processor bus through the bridge;

at least one bus agent coupled to the expansion bus, the at least one bus agent including a storage medium coupled to the expansion bus and arranged to store data, the at least one bus agent also including bus agent logic adapted to receive data from the storage medium, said at least one bus agent further comprises bus agent logic selectively responsive to signals in either a first protocol or in a second standard protocol;

said first protocol providing different timing and logical operations from said second standard protocol; wherein:

said first protocol signals are stored in said storage medium during a storage phase of a clock period and a response is driven on the expansion bus by the bus agent logic during a response phase of a subsequent clock period; and said second protocol signals are sampled from the expansion bus during one phase of a clock period and a response is driven on the expansion bus during a subsequent phase of the same clock period.

9. The system of claim 8 wherein the second protocol comprises a protocol specified by the PCI Special Interest Group Specification 2.1.

10. The system of claim 8 wherein the storage medium comprises a latching register.

11. The system of claim 8 wherein the expansion bus operates at a frequency greater than 66 MHz.

12. The system of claim 8 wherein the at least one bus agent comprises a video controller, the system further comprising a display device coupled to the video controller.

13. The system of claim 8 wherein the at least one bus agent comprises a hard disk controller.

14. The system of claim 5 wherein the expansion bus conforms to PCI Special Interest Group Specification 2.1.

* * * * *